(12) United States Patent
Schafer

(10) Patent No.: US 8,556,567 B2
(45) Date of Patent: *Oct. 15, 2013

(54) PACKING STATION AND ORDER-PICKING METHOD

(75) Inventor: Gerhard Schafer, Keunkirchen (DE)

(73) Assignee: SSI Schaefer Noell GmbH Lager- und Systemtechnik, Giebelstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,586

(22) Filed: Aug. 1, 2011

(65) Prior Publication Data

US 2012/0020767 A1  Jan. 26, 2012

Related U.S. Application Data

(63) Continuation of application No. 12/275,616, filed on Nov. 21, 2008, now Pat. No. 7,988,406, and a continuation of application No. PCT/EP2007/004545, filed on May 23, 2007.

(30) Foreign Application Priority Data

May 24, 2006  (DE) .......................... 10 2006 025 618

(51) Int. Cl.
  *B65G 1/00*  (2006.01)
(52) U.S. Cl.
  USPC ..................... 414/802; 414/286; 414/796.5
(58) Field of Classification Search
  USPC ......... 414/273, 274, 286, 403, 416.11, 795.9, 414/796.2, 796.5, 796.9, 797, 799, 807; 700/214, 216–217

See application file for complete search history.

(56) References Cited

U.S. PATENT DOCUMENTS

| | | | | |
|---|---|---|---|---|
| 3,782,564 | A | | 1/1974 | Burt |
| 4,088,237 | A | * | 5/1978 | Brown .......................... 414/807 |
| 4,678,390 | A | * | 7/1987 | Bonneton et al. ............. 414/282 |
| 4,722,653 | A | | 2/1988 | Williams et al. |
| 4,850,783 | A | | 7/1989 | Maekawa |
| 4,909,697 | A | * | 3/1990 | Bernard et al. ........... 414/331.04 |
| 4,979,870 | A | * | 12/1990 | Mojden et al. ............. 414/788.4 |
| 5,033,929 | A | | 7/1991 | Marti |
| 5,246,332 | A | * | 9/1993 | Bernard et al. ............... 414/807 |
| 5,363,310 | A | * | 11/1994 | Haj-Ali-Ahmadi et al. .. 700/216 |
| 5,669,748 | A | * | 9/1997 | Knudsen, Jr. ................. 414/273 |
| 6,061,607 | A | | 5/2000 | Bradley et al. |
| 7,988,406 | B2 | * | 8/2011 | Schafer .......................... 414/807 |
| 2003/0147738 | A1 | | 8/2003 | Hanel |
| 2004/0191049 | A1 | | 9/2004 | Winkler |

FOREIGN PATENT DOCUMENTS

| | | |
|---|---|---|
| DE | 103 13 576 A1 | 10/2004 |
| EP | 1516832 | 1/2006 |
| JP | 2002193404 A | 7/2002 |

\* cited by examiner

*Primary Examiner* — Gregory Adams
(74) *Attorney, Agent, or Firm* — McNeely, Hare & War LLP; Kevin J. McNeely

(57) ABSTRACT

An order-picking system and method that includes a high-bay warehouse, at least one tray warehouse, at least one packing station, at least one shipping station and a conveyor technique to bring the tray loaded with the pallet layer into the tray warehouse. The conveyor technique may be a conveyor, a storage machine and/or a lift.

20 Claims, 8 Drawing Sheets

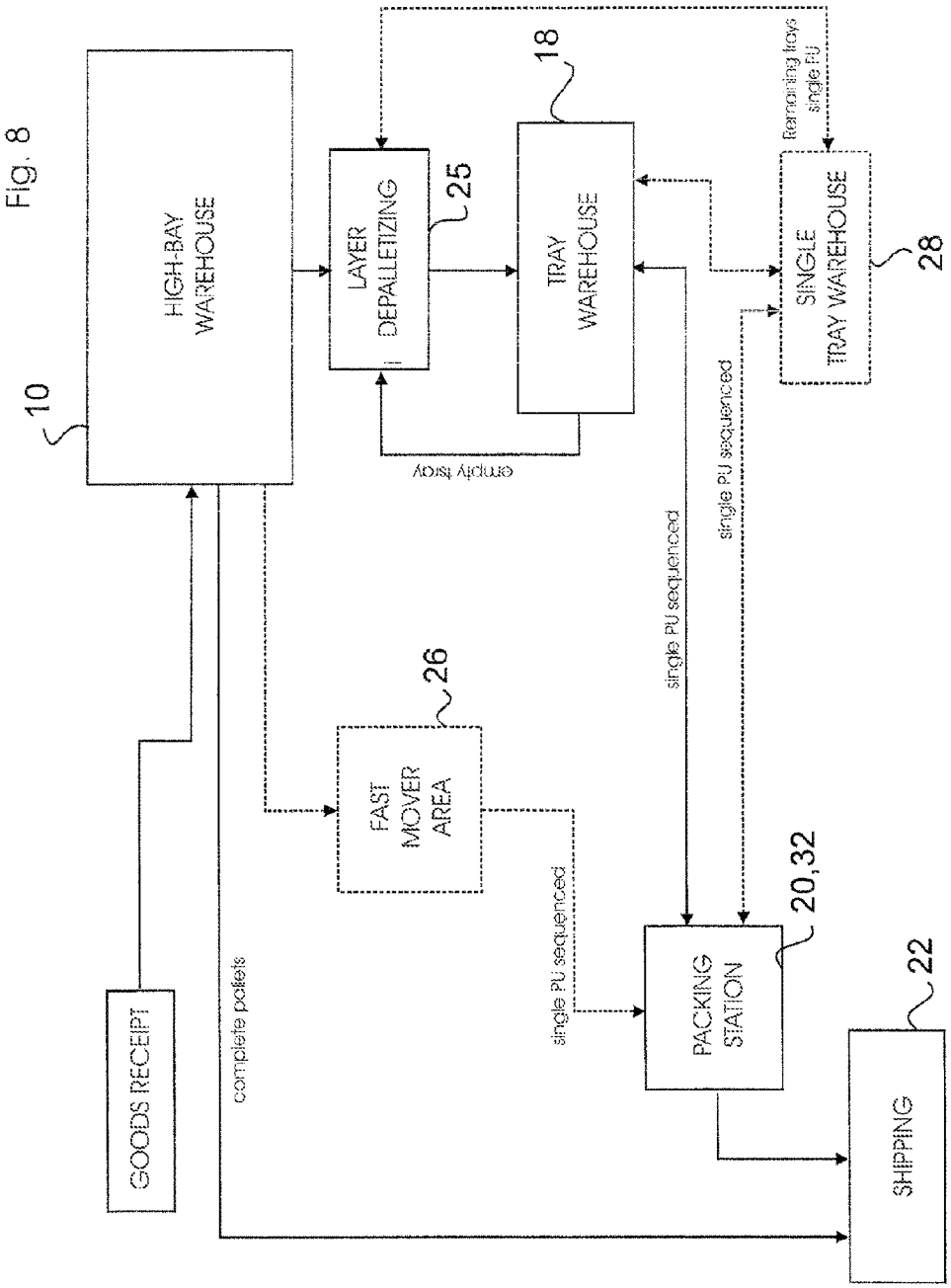

PACKING STATION AND ORDER-PICKING METHOD

RELATED APPLICATIONS

This is a continuation application of co-pending U.S. patent application Ser. No. 12/275,616 filed on Nov. 21, 2008, international application PCT/EP2007/004545 (WO 2007/134841) filed on May 23, 2007, and German patent application DE 10 2006 025 618 filed on May 24, 2006 which are fully incorporated herewith by reference.

BACKGROUND OF THE INVENTION

The present invention relates to a method for operating an order-picking system, wherein the order-picking system comprises a high-bay warehouse, at least one tray warehouse, at least one packing station and at least one shipping station.

RELATED PRIOR ART

Such an order-picking system is known from DE 103 13 576 B4.

The order-picking system disclosed in DE 103 13 576 represents a logistic system which is almost completely automated for saving costs and time. Storing articles into a high-bay warehouse as well as the retrieving therefrom happens, in this context, by means of automated and computer-controlled rack vehicles.

This high-bay warehouse represents a conventional rack warehouse being formed as a pallet warehouse. Articles or goods are stored into the pallet warehouse on delivery pallets. A tray warehouse is connected to the rack warehouse via an automated conveyor technique. Inside the tray warehouse articles or packing units, which are to be picked, are individually stored on single trays.

Thus, each tray is loaded with a single packing unit. In international logistics, a packing unit, in case piece goods are used, is also called a "collo" (plural "colli"; derived from the Italian "collo"). A packing unit is the smallest unit of a consignment of goods or of an order-picking order. A package having twelve milk bags welded to each other by means of a foil, for example, represents a packing unit.

In logistics, piece goods designates everything being transportable in one piece such as cases, loaded pallets, machines or parts thereof, cable reels, paper reels or metal sheet reels, and barrels. For example, liquid freight or gases, which are pumped, for example, into a transport vehicle without having a container on its own, exemplarily do not represent piece good. Sand, coal, grain and comparable solid matters are bulk goods, or soakable goods. The present invention is substantially applicable to piece goods.

In the order-picking system of DE 103 13 576 pallets from the pallet warehouse are singularized in a known automated manner by means of a depalletizing device, with grabbing and soaking means to form individual packing units on single trays. Packing units singularized in this way are subsequently stored into the tray warehouse serving as a buffer. If an article in the tray warehouse becomes rare, for example, due to being picked, i.e. if a reserve for only 24 or 48 hours is still present, articles from the pallet warehouse are requested, removed from the pallets and completely singularized by means of the depalletizing device, and subsequently loaded individually onto the trays. This system of DE 103 13 576 is due to the many devices very expensive and requires a lot of space.

Further, nowadays great demands are made on the conceptioning of an order-picking warehouse, particularly in the field of retail.

A typical order-picking system should be able to pick 50,000 to 100,000 or more packing units each day. This corresponds roughly to 1000 to 2500 and more pallets each day. An order-picking process is performed in accordance with an order-picking order. An order-picking order, as a rule, consists of several order lines. Each order line, however, can be formed of several packing units of one (single) type of article. In order to process an order-picking order, the different types of articles are retrieved in predetermined numbers from the tray warehouse on default (order lines), and are packed onto a shipping support such as a roller container or a EuroPallet (800 mm×1200 mm).

In the order-picking system known from DE 103 13 576 completely loaded pallets from the high-bay warehouse are completely singularized and transported in an automated manner on single trays into the tray warehouse. This way of action gives rise to provide the tray warehouse with a sufficient number of storing positions. A storing position is to be understood as a storage space dedicated to a tray within the tray warehouse.

Due to the great number of storing positions correspondingly many storage machines (rack feeders or rack serving devices) are required for storing and retrieving the single trays into the plurality of storing positions. The plurality of storing positions, in turn, is distributed over a plurality of racks of the tray warehouse. Many racks, in turn, mean a huge requirement for space in order to set up these racks.

Further, the use of many storage machines makes coordination thereof extremely complex. A superordinated warehouse administration computer must plan into the future as far as possible, in order to deal with the remarkable number of so-called storage cycles. A "storage cycle" or "exchange cycle" is hereinafter understood as a process during which a load support (tray, pallet, container, etc.) is retrieved from the warehouse for the purpose of being picking, in order to be transported subsequently to an order-picking station and packed onto a shipping support, which, in turn, is shipped.

A high amount of storage cycles, in turn, lowers the flexibility and dynamics of the entire system. If almost all storage machines are permanently in use, and if coordination thereof is complexly involved and greatly planned in advance, a suddenly occurring event, such as increasing priority of an order-picking order from a lower priority level to an upper priority level, cannot be responded to at all or only in a bad manner.

Therefore, it is an object of the present invention to provide a method for operating an order-picking system which enhances the efficiency, flexibility and dynamics of the entire system. Particularly, the need for space regarding tray warehouse should be reduced, and the planning involved with the coordination of the storage machines should be decreased. Preferably, the investment costs are to be lowered dramatically.

This object is solved in accordance with the present invention by a method for operating an order-picking system, wherein the order-picking system comprises a high-bay warehouse, at least one tray warehouse, at least one packing station and at least one shipping station. The method comprises the following steps: storing of at least a pallet, particularly a EuroPallet, respectively carrying a plurality of packing units, which are to be picked, of an article type into the high-bay warehouse, particularly by means of a rack feeder, wherein the packing units are piled up on the pallet in terms of at least one pallet layer; depalletizing the packing units in a layer-wise manner, the packing units forming, particularly an entire, pallet layer, from the pallet onto a correspondingly dimensioned tray; bringing the tray loaded with the pallet layer into the tray warehouse, preferably by means of a conveyor technique, a storage machine and/or a vertical lift; recalling the tray, which is loaded with the pallet layer to the packing station, in accordance with an order-picking order or several order-picking orders; removing in accordance with the order-picking order or one of the order-picking orders, a predetermined number of packing units, which are to be picked, and packing the removed packing units onto a shipping support in order to ship the shipping support in case of completion of the order-picking order to a customer.

The inventors have noted that the proposed method allows heavy reductions of the number of storing positions within the tray warehouse, and thus the number of racks as such, upon identical input performance (e.g. 150 pallets/h) and output performance (e.g. 150 pallets/h). The reduction of the storing positions and racks causes a reduction of storing machines for storing and retrieving packing units into the tray warehouse and from the tray warehouse.

The inventors have also noted that by experiences gained with order-picking containers can be transformed to an order-picking of piece goods, resulting in a reduction of storage cycles with an identical performance (packing units/h). Since packing units are not stored individually but by means of pallet layers onto trays (e.g. 10 packing units onto a single tray) a reduction of the storage cycles is possible (instead of retrieving 10 single trays from the tray warehouse, now only one "big tray" is retrieved from the tray warehouse). A reduction of the storage cycles allows a reduction of the number of storage machines employed.

The reduction of the number of storage machines, in turn, expresses in a reduction of the purchase costs. A conventional order-picking system can cost up to 30 millions Euro. A comparable order-picking system, which is operated in accordance with the present invention, with regard to the performance costs, for example, only 15 to 18 million Euro.

Another advantage is to be seen in the low coordination involved. In order to stay in the picture of the above example, in the prior art, it was necessary to move the storage machine ten times (10 storage cycles). In accordance with the present invention, the storage machine is sent into the tray warehouse for only one single time for retrieving one single tray having a pallet layer formed by, for example, 10 packing units. In this connection, it is to be noted that the planning involved with regard to sequencing is reduced or omitted. Sequencing is required for allowing provision of several demanded articles at the right place and at the right time. In the prior art, if ten packing units of one single type of articles were demanded, considerable problems with regard to the temporal synchronization (sequencing) could arise. In accordance with the present invention it is merely necessary to retrieve a single tray from the tray warehouse so that these sequencing and synchronization problems, respectively, are omitted.

In accordance with a preferred embodiment the tray is either stored back into the tray warehouse or disbanded into single packing units, which preferably are re-handled on corresponding single trays and subsequently brought into a separate single-tray warehouse, after the removal of the packing units, if not all of the packing units are removed, which were stored originally on the tray as a pallet layer.

By storing back trays packing units which have not been removed completely during an order-picking process the concept of container picking is implemented. Here, the idea of handling a tray like a container—and not like a single packing unit—is expressed. This reduces the number of storage cycles significantly.

As an alternative to storing back a tray which, for example, is merely loaded with one single (remaining) packing unit of originally, e.g. ten packing units, this single packing unit can be rehandled onto a (smaller) single tray and brought into a (separate) single-tray warehouse. By this measure the capacity in the warehouse for (big) trays is increased. The single packing units, which are then stored in the single-tray warehouse, can be used for processing such order-picking orders which require, for example, only one single packing unit for its completion. In this manner, the number of storage cycles in the warehouse for (big) trays can be reduced by an additional storage cycle in the single-tray warehouse. As the main order-picking performance, however, is achieved in the tray warehouse, this additional storage cycle in the single-tray warehouse is acceptable. It even increases the performance of the (big) tray warehouse since the process of storing back is omitted.

Particularly, exclusively trays are stored in the tray warehouse, which respectively are loaded with one, particularly single, pallet layer.

A pallet layer can be depalletized easily (in a layer-wise manner).

The depalletizing happens preferably so that articles of one sort only are present on the tray.

Particularly, it is advantageous if several order-picking orders are combined to a so-called "batch" (the term will hereinafter be explained in more detail) that preferably all, but as much as possible packing units, which are loaded onto trays as pallet layers, are removed from the tray at the packing station so that the tray is preferably empty after the removal.

An empty tray does not need to be stored back into the tray warehouse, as explained above. The number of storage cycles is reduced. An empty tray can be brought directly to the depalletizing device.

The combination of several order-picking orders in accordance with identical types of article also decreases the number of storage cycles in the tray warehouse. Two order-picking orders comprising the same type of article but in different numbers are temporarily, at least as far as the work of the storage machine in the tray warehouse is concerned, fused to one single order-picking order (batch formation). Thus, the number of storage cycles is reduced from two to one. However, this increases the dynamics and decreases the complexity of planning. Preferably, all packing units of a certain type of article are combined, for example, for an entire day, reducing the number of storage cycles significantly which are necessary for the processing of the order-picking orders.

Particularly, the batch combination happens in accordance with groups of article types (crash classes, family groups). In this way packing of yoghurt cups (fragile) in combination with beer boxes (robust) can be avoided.

In accordance with another embodiment the step of bringing the trays into the tray warehouse comprises the steps of: transporting the trays loaded with the pallet layer into the tray warehouse; and storing the tray in a storing position of the tray warehouse.

The step of recalling the tray to the packing station preferably comprises retrieving the tray from the tray warehouse and transporting the retrieved tray to the packing station, particularly by means of a conveyor technique.

In accordance with another preferred embodiment the step of storing the pallet is repeated that often until all article types of an assortment are stocked on pallets in the high-bay rack in a sufficient number for allowing operation of the order-picking system for several days without another storing of pallets (goods receipt).

However, particularly complete disbandment of pallets onto trays is preferred. The order-picking stock is then located within the tray warehouse. The goods receipt in the high-bay warehouse is handled in the known manner. Thus, rack feeders of the high-bay warehouse only move completely loaded or empty pallets into the warehouse and out thereof. If the order-picking stock is buffered in the tray warehouse, the high-bay warehouse can become "slower" (at the same performance). Then, the dynamics is shifted from the high-bay warehouse into the tray warehouse. In total, less machines are required in comparison with the prior art. The high-bay warehouse is used in accordance with the present invention as a storage, the stock of which is determined, among other things, by sales/turnover and delivery cycles. The tray warehouse serves as order-picking buffer having a short "range" of 2-3 days, which can be adapted to the performance of an existing high-bay warehouse in case of re-stocking of an existing warehouse.

Further, the high-bay warehouse can completely be omitted in cases of short delivery cycles (i.e. at small stocks) if directly coupled to a customer-own production or operation as trans-shipment center.

In this manner it is ensured that the system can be operated in an autarkic manner for several days. Hence, the order-picking system is independent of the goods receipt for a longer period of time.

Even further, it is advantageous if the step of layer-wisely depalletizing comprises the following steps: transporting a pallet from the high-bay warehouse to a depalletizing device, preferably by means of a rack feeder; removing a, preferably complete, pallet layer from the pallet; and disposing the removed pallet layer onto the correspondingly dimensioned tray.

These steps can be performed either in an automated manner or manually. The automated embodiment, however, increases the automation level.

Further, it is advantageous if respectively one single pallet layer only is removed and disposed, if a type of article required for the completion of an order-picking order is not present in the predetermined number of packing units in the tray warehouse, and respectively one single tray only is brought into the tray warehouse until the predetermined number is achieved in the tray warehouse. This can be particularly advantageous with "C" articles.

By this measure it is ensured that the spatial dimension of the tray warehouse can be kept extremely small. The tray warehouse is used as a buffer. However, the bigger buffer of the system is to be seen in the high-bay warehouse. Preferably, both warehouses have a buffer function of an identical value. This, in turn, increases the dynamics and flexibility in the region of the tray warehouse.

Pallets of the high-bay warehouse do not need to be completely disbanded, i.e. depalletized, as usually done in the prior art. In this way, it is, for example, possible that a pallet loaded with five pallet layers is merely reduced by two or three pallet layers, and subsequently the pallet is stored back into the high-bay warehouse including three or two pallet layers.

For that purpose, it is a further advantage if the pallet, from which one, several or all pallet layers are removed, is stored back into the high-bay warehouse, in case the predetermined number of packing units in the tray warehouse is achieved.

In accordance with another embodiment completely loaded pallets carrying one type of article being present in order-picking orders above the average (fast movers) are retrieved from the high-bay warehouse and provided in a fast-mover area.

By this measure, the tray warehouse can be bypassed upon order picking. Thus, packing units do not need to be brought into the tray warehouse categorically, but can be picked directly from the pallet stored in the fast-mover area. In this manner, the number of storage cycles in the tray warehouse is reduced. In accordance with another embodiment the step of depalletizing in a layer-wise manner comprises manual transferring pallet layers onto trays consisting of packing units of a type of article which cannot be transferred in an automated manner.

There are types of articles the outer package of which is, for example, heavily fragile. An automated depalletizing of such types of articles is not possible since the packing units could be damaged during the automated depalletizing process. These types of articles, in expert groups, are also designated as "ugly" or "non-conveyable". In accordance with the method of the present invention the handling of difficultly handable packing units ("cases") is nevertheless possible.

In accordance with another embodiment the trays are sorted during the step of recalling to the packing station.

Thus, it is possible that recalled trays arrive in a predetermined sequence (in a sequence manner) at the preferably remotely located packing station.

Further, it is preferred if several order-picking orders are processed parallelly.

This measure, in turn, increases the total performance by reduction of performance required by the warehouse. With an identical throughput, the warehouse can be operated "more slowly", i.e. it is less costly to move a number of articles which remains constant.

It is clear that the features mentioned above and still to be explained are not only usable in the respectively given combination but also in other combinations or alone, without departing from the scope of the present invention.

BRIEF DESCRIPTION OF THE DRAWINGS

Embodiments of the invention are depicted in the drawings and will hereinafter be explained in the following description, wherein:

FIG. 8 shows a block diagram including work flows of load supports.

PREFERRED EMBODIMENTS OF THE INVENTION

Figure 1:
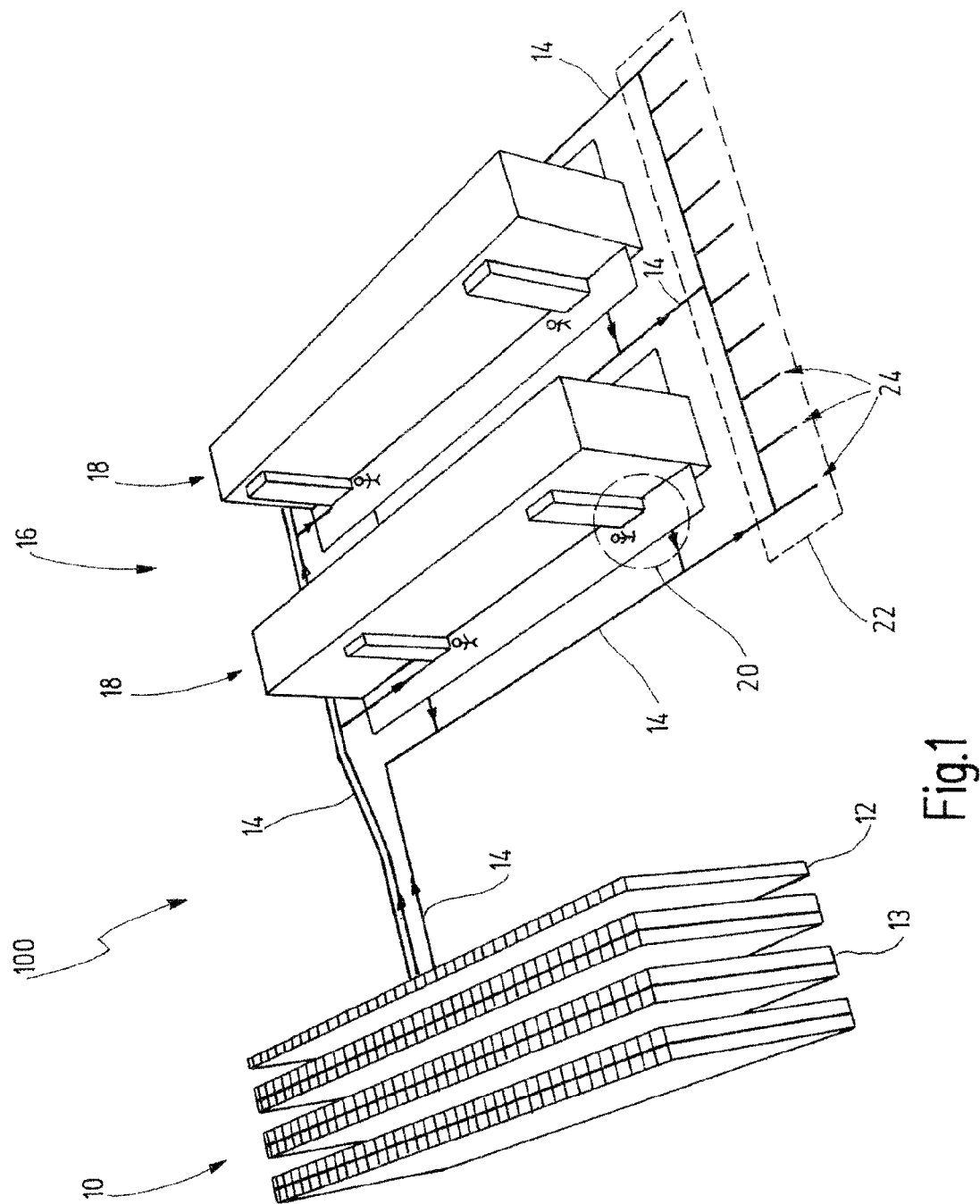
FIG. 1 shows a schematic perspective view of an order-picking system suitable for performing the method in accordance with the present invention.

In the following description of the Figures identical elements will be designated by identical reference numerals.

In FIG. 1 an embodiment of an order-picking system is generally designated by the reference numeral 100.

The order-picking system 100 comprises a high-bay warehouse 10, a plurality of conveyor techniques 14, a tray warehouse 16, packing stations 20 and a shipping area 22 having shipping stations 24.

The high-bay warehouse 10 can be constructed of several single racks 12 and double racks 13. The high-bay warehouse 10 is suitable for receiving load supports such as pallets, trays, containers, etc. With the present invention, preferably pallets are stored via a goods receipt (not shown) into the racks (12, 13). As pallets can be used: Chep (400×600 mm), Düsseldorfer pallets (600×800 mm), EuroPallets (800×1,200 mm), industrial pallets (100×1,200 mm), GMA pallets (1,200×1,200 mm), roller container (720×815 mm), etc. As will explained hereinafter in more detail, the goods-receipt pallets are depalletized in a layerwise manner, i.e. in accordance with pallet layers, onto (big) trays. The corresponding trays comprise correspondingly adapted dimensions (500×700 mm; 700×900 mm; 900×1,300 mm; 1,100×1,300 mm; 1,300×1,300 mm; 800×900 mm).

The high-bay warehouse 10 is dimensioned so that, preferably, sufficient articles can be buffered in order to allow order-picking from the high-bay warehouse 10 for several days or weeks without any problem, and without the need to (daily) deliver new articles to the goods receipt. It is clear that high-bay warehouse 10 can also be of another type of rack warehouse comprising a corresponding capacity. Usually, rack feeders (RF) are used in high-bay racks for storing and retrieving pallets of the goods receipt.

By the aid of RF (not depicted) pallets from the high-bay warehouse 10 are brought to a depalletizing device which is not depicted here, for being depalletized (in terms of pallet layers) preferably in a layerwise manner, namely onto correspondingly dimensioned trays, as explained above. The trays are transported particularly by means of conveyor techniques 14 such as motor-operated roller tracks, belt conveyors, etc., to the tray warehouse 16, where they are stored into storing positions (not shown) of one of the two rack blocks 18 presented here. The storing and retrieving can happen via laterally arranged vertical lifts being arranged at longitudinal sides of the rack blocks 18, as depicted in FIG. 1.

The rack blocks 18 depicted in FIG. 1 comprise, for example, respectively four single racks, the two centrally arranged racks standing back-to-back. Each rack is divided into several planes in a vertical direction. Two oppositely arranged racks are respectively served in horizontal and vertical directions by a storage machine, which substantially is movable horizontally. The storage machines are movable both horizontally and vertically (simultaneously), and are adapted for storing and retrieving trays, each of which is preferably loaded with a complete pallet layer. For that purpose, preferably several load supporting devices are provided for each storage machine (side-by-side and/or on top of each other). The lateral vertical lifts in the exemplary order-picking system 100 of FIG. 1 simultaneously serve as packing stations 20. The packing station 20 is integrated into the rack and, preferably arranged at a level located at least one rack plane above the system floor.

Packing units are removed from presented trays at the integrated packing station 20. The removal happens by default of an associated order-picking order. Preferably, the shipping supports, onto which the retrieved packing units are packed, are also pallets, particularly of that type of pallets which is used in the high-bay warehouse 10 as well. The shipping support is lifted by a lifting device (not shown) to the level of the integrated packing station 20, and then, preferably, lowered in a layerwise manner as soon as a layer is packed with packing units. If the shipping support is completely packed, it can be conveyed via the conveyor technique 14 into the shipping area 22. The shipping area 22 comprises here a plurality of shipping stations 24. The completely packed shipping supports, for example, can be loaded into trucks at the shipping stations 24 and are driven to the customer.

Figure 2:
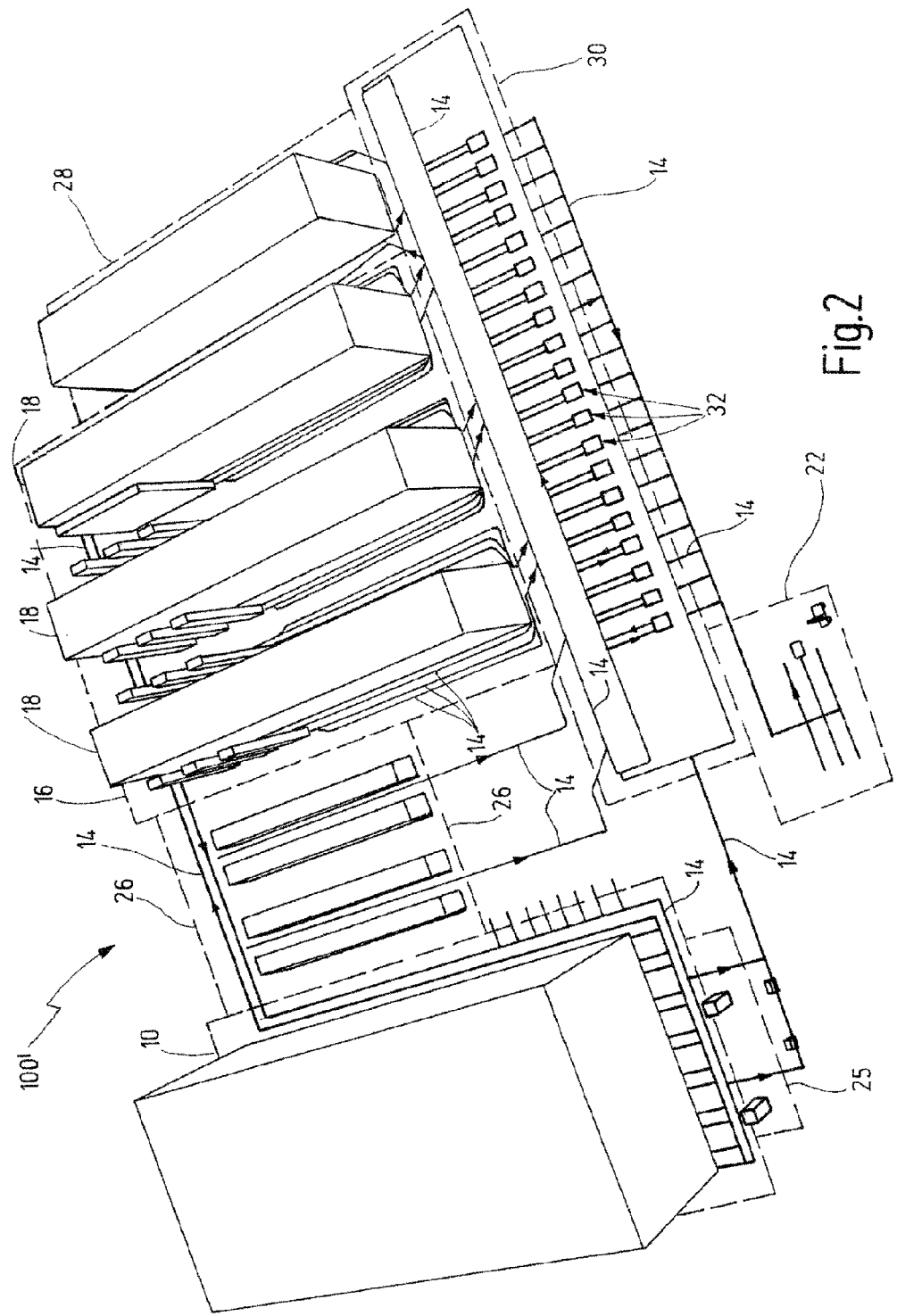
FIG. 2 shows a schematic perspective view of another embodiment of an order-picking system suitable for performing the method in accordance with the present invention.

FIG. 2 shows another order-picking system 100' which is constructed almost similar in comparison with the order-picking system 100 of FIG. 1.

Here, a depalletizing area 25 having two depalletizing devices (cf. also FIG. 3) is depicted at a front face of the high-bay warehouse 10. The number of depalletizing devices can be chosen arbitrarily.

Here, between the high-bay warehouse 10 and the tray warehouse 16 a so-called fast-mover area 26 is arranged. A fast mover is to be understood hereinafter as a type of article which, from a statistical point of view, occurs very often in order-picking orders. Preferably, within the fast-mover area 26 completely loaded pallets from the high-bay warehouse 10 are stored. A conveyor technique for transporting articles to be picked is arranged through the fast-mover area 26.

Even further, a single-tray warehouse 28 is arranged at the right hand edge of FIG. 2 adjacent to the tray warehouse 16. The tray warehouse 28 serves for storing of so-called single trays. A single tray is a tray being dimensioned such that it can merely receive one single packing unit. With particularly small packing units several packing units can be received as well. The functionality of the single-tray warehouse 28 as well as the reasons for the (additional) provision thereof will be explained hereinafter in more detail.

The order-picking system 100' of FIG. 2 further includes a packing area 30 having a plurality of packing stations 32. The packing stations 32 substitute the packing stations 20 integrated into the rack as shown in the order-picking system 100 of FIG. 1. Therefore, the vertical lateral lifts of the rack blocks of the tray warehouse 16 here are also connected with the packing area 30 via the conveyor technique 14. Preferably, a conveyor technique loop is arranged in the packing area 30, allowing to sort trays retrieved from the tray warehouse 16 on its way to the packing station 32.

Also here, the packing stations 32 are arranged at two levels so that during the packing a shipping support can be lowered to a shipping level, for being transported subsequently to the shipping area 22.

Figure 3:
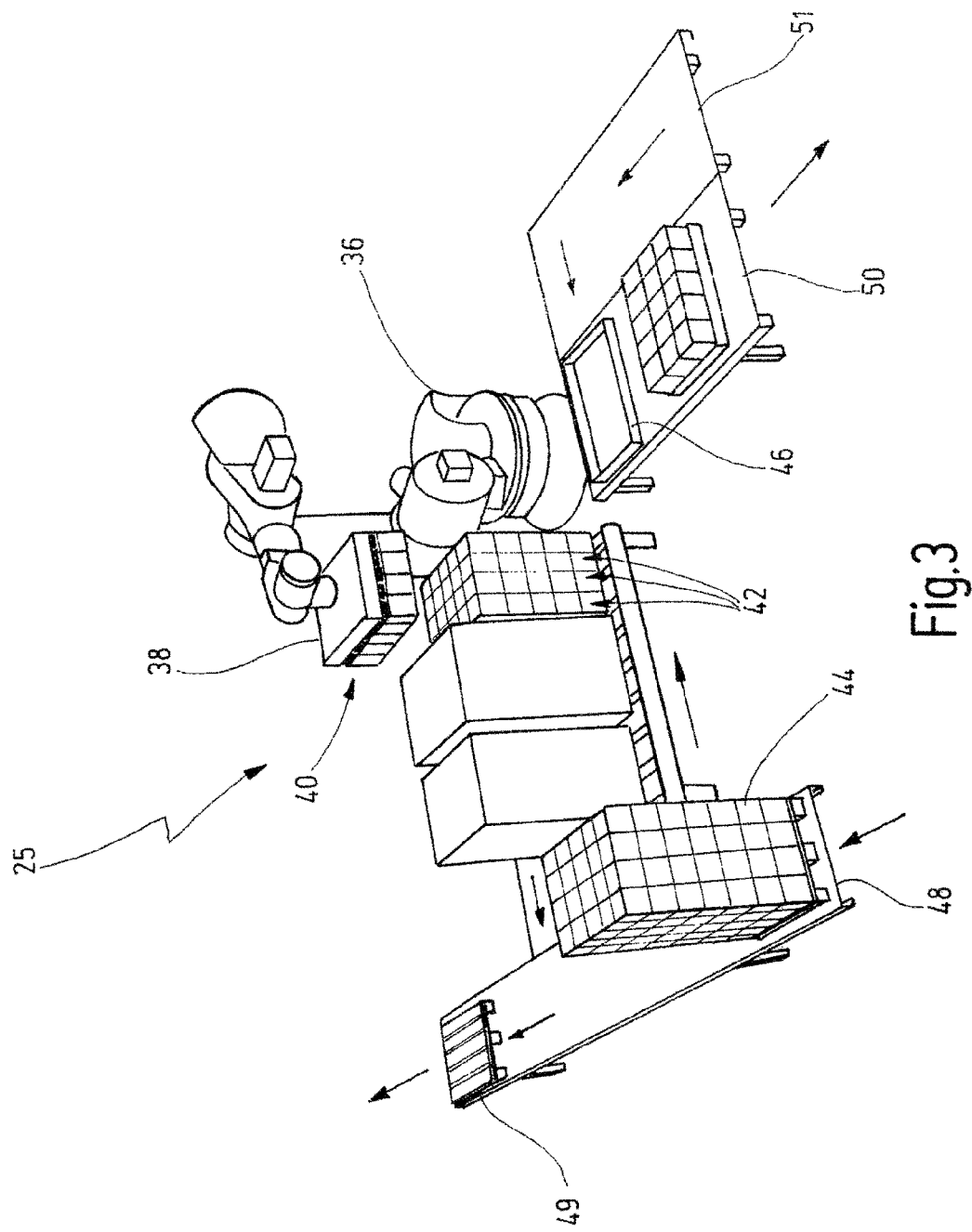
FIG. 3 shows a schematic perspective view of a depalletizing device.

With reference to FIG. 3 an exemplarily depalletizing area 25 having robots 36 for depalletizing in a layerwise manner is shown.

The robot 36 comprises a soaking mechanism 38 for grabbing which can grab and transfer complete pallet layers 40 consisting of packing units 42 by means of vacuum.

For that purpose, preferably pallets 44 completely loaded are transported to the robot 36 (from the high-bay warehouse which is not depicted here). The robot 36 transfers the pallet layer 40 onto an empty tray 46 which is suitable for receiving a complete pallet layer 40.

The transport of the different load supports is performed here by means of conveyor techniques 48-51 (cf. reference numeral 14 in FIGS. 1 and 2). Pallets 44 from the high-bay warehouse 10 (here not depicted), which are partially or completely loaded, are transported by means of a pallet conveyor technique 48 to the robot 36. Empty pallets are transported away from the robot 36 by means of a conveyor technique 49, preferably to the packing stations (cf. FIG. 1 as well as FIG. 2). Partially depalletized pallets can be stored back into the high-bay warehouse. The empty trays 46 are then transported to the robot 36 by means of a conveyor technique 51. Trays, which are full and loaded with a pallet layer, are transported into the tray warehouse 16 by means of a conveyor technique 50.

Figure 4:
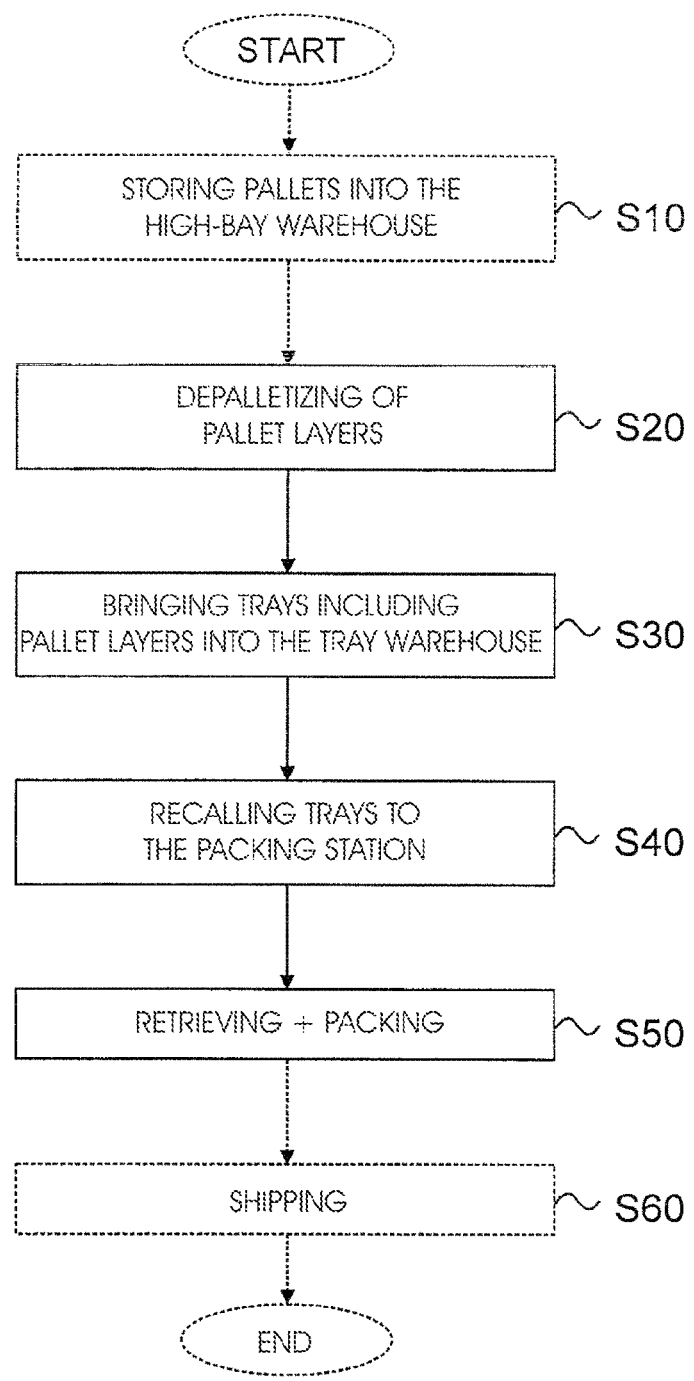
FIG. 4 shows a flow chart in accordance with the method of the present invention.

In the following, with reference to FIG. 4 the method of operating an order-picking system is shown, as represented, for example, by one of the order-picking system depicted in the FIGS. 1 and 2.

In a first step S10 pallets, which are preferably completely loaded, can be stored into the high-bay warehouse 10. Particularly, so many pallets are stored that each type of article is stocked in the high-bay warehouse 10 in a sufficient number of packing units, in order to allow working in an autarkic manner (in the tray warehouse) for several days or weeks. A goods-receipt pallet, however, can also be disbanded directly so that storing into the high-bay warehouse can be omitted.

The pallets (from the high-bay warehouse 10) are transported to a depalletizing device (cf. FIG. 3) in a step S20, in order to be depalletized in a layer-wise manner. Depalletizing in a layer-wise manner is to be understood hereinafter as the transferring of a, particularly complete, pallet layer, particularly onto a tray.

Subsequently, the trays are brought into the tray warehouse 30 in a step S30. Preferably, in the tray warehouse 30 are explicitly stored such trays—coming from the high-bay warehouse—which are loaded with a complete pallet layer. Storing-back processes from a packing station back into the tray warehouse, however, are also possible as will be explained hereinafter in more detail. Particularly, trays picked empty can be re-stored.

Packing units are removed from the trays of the tray warehouse and packed at a packing station in a step S50, the packing station being arranged either separately relative to the tray warehouse (FIG. 2) or integrated therein (FIG. 1). The retrieval from the tray warehouse for the purpose of order picking, in turn, is performed by the above-mentioned storage machines being suitable for receiving and delivering trays having pallet dimensions. The storage machines preferably engage the front side of the trays and do not reach underneath the trays so that here, in turn, space can be saved at the storing position.

It is clear that trays which have been completely picked at the location of the packing station, i.e. empty trays, can first be stored back into the tray warehouse in order to be loaded again with a new pallet layer, for being transported subsequently to the depalletizing device.

In an optional step S60 loaded shipping supports, particularly pallets, are shipped to the customer in accordance with a completely processed order-picking order.

Figure 5:
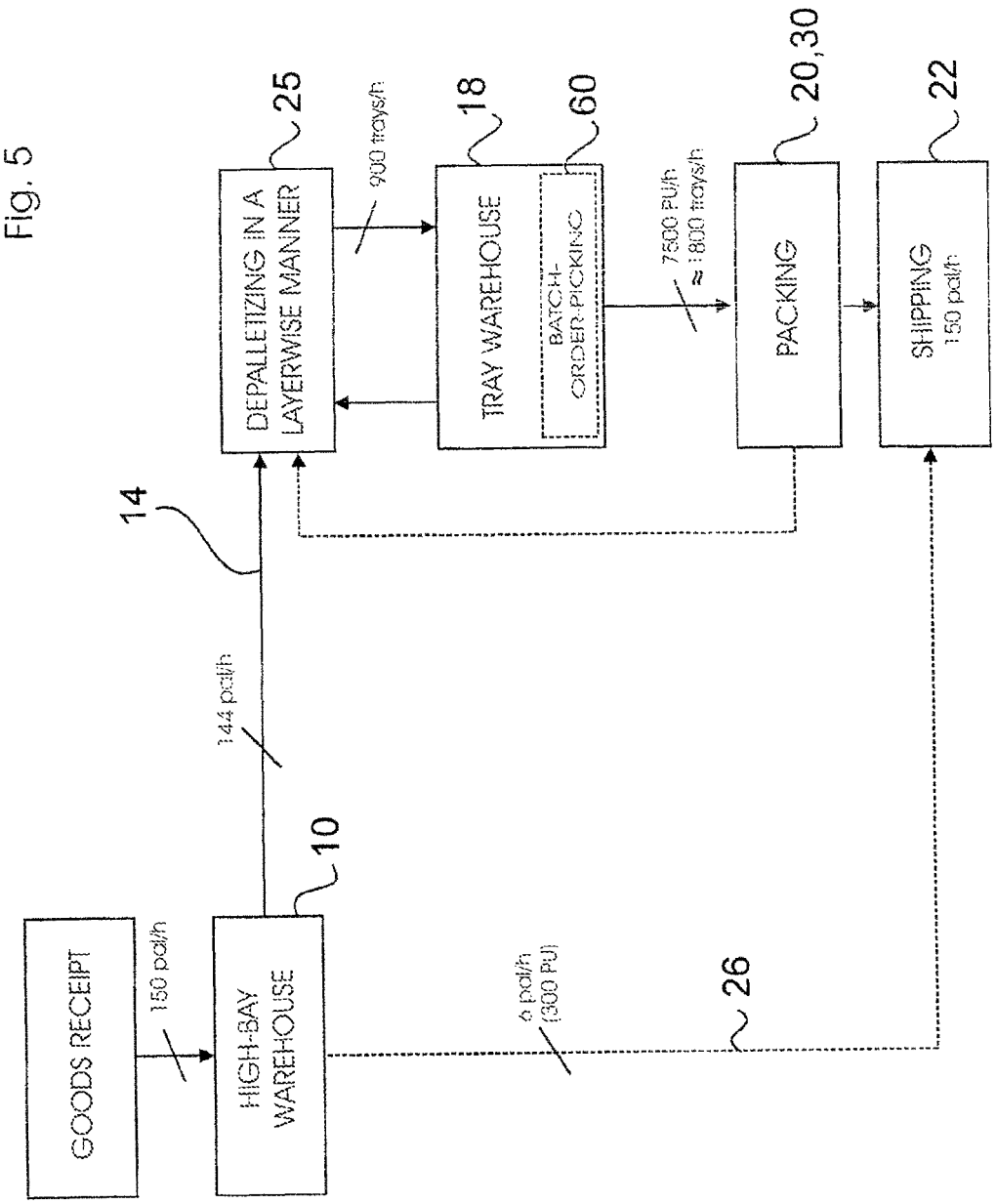
FIG. 5 shows a block diagram of an order-picking system for performing the method in accordance with the present invention.

In FIG. 5 the order-picking system of FIG. 1 is depicted in terms of a block diagram, wherein here complete pallets can be directly shipped as illustrated by a dotted line. The arrows between the blocks generally represent a transport of load supports between the different elements. The figures at transversal strokes indicate the performance and, respectively, the throughput of pallets, trays, packing units (PU) and similar.

With the example shown in FIG. 5, 150 pallets are exemplarily delivered each hour (pal/h) into the high-bay warehouse 10. 144 pallets of these 150 pallets are brought into the depalletizing area 25 for being depalletized in a layer-wise manner. For that purpose, preferably the conveyor technique 14 (cf. FIGS. 1 and 2) is used.

Alternatively, 6 pal/h, i.e. about 300 packing units/h, are directly picked in terms of entire pallets in the example of FIG. 5.

Assuming that a pallet is loaded in average by six pallet layers, this results in a depalletizing rate of about 900 trays per hour (trays/h). These 900 trays are, preferably, of one single sort only, stored into the tray warehouse 16.

Within the tray warehouse 16 the trays are then retrieved in accordance with order-picking orders to be processed, and transported to the packing station which is either integrated into the tray warehouse or arranged separately. By means of batch order picking the number of storage cycles, which are required for retrieving the corresponding trays, is significantly reduced. As will be hereinafter explained in the context of FIG. 6 in more detail, 7500 storage cycles would be necessary in the prior art, in order to retrieve 7500 individual packing units per hour in and from the prior art tray warehouse.

However, in accordance with the present invention preferably several order-picking orders are combined to form a batch. With a batch several order-picking orders are combined, which all concern one and the same type of article. Thus, for example it would be conceivable that a branch A demands, for example, six packing units milk in terms of 12 one-liter bags, and a branch B needs, for example, four packing units of 12 one-liter bags. These two orders are combined to form a batch for the article type "one-liter milk bags". Without batch formation two storage cycles (two retrievals) were necessary for processing both order-picking orders (or order lines). However, due to the batch formation only one single storage cycle (a retrieval process) is necessary. In the prior art, even ten storage cycles would have been necessary, since the packing units would be stored on ten different single trays.

A batch formation is not possible when single trays are used. Therefore, an expert, up to now, did not get the idea to put the batch formation known from the field of container order picking into practice also in a tray warehouse. The inventors, however, have recognized that the transformation of the concept of container order picking to tray warehouses achieves astonishing advantages with regard to dynamics, space requirement and investment costs. These advantages will become particularly apparent in connection with FIG. 6, where the way of action in accordance with the invention is compared to the way of action according to the prior art on the basis of an example.

Figure 6:
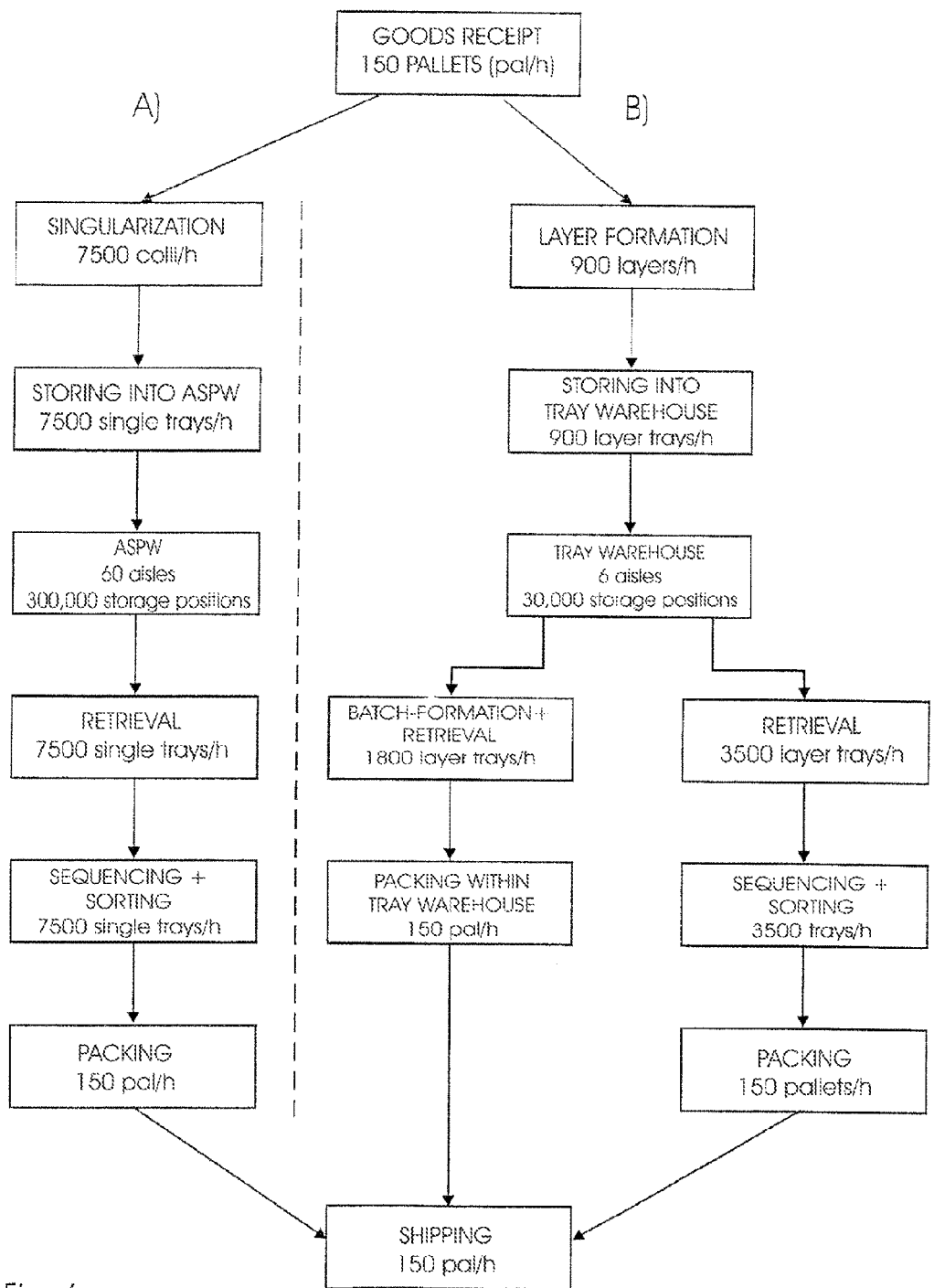
FIG. 6 shows a comparing flow chart for comparing the method of the invention with the prior art by using figures.

Thus, FIG. 6 shows in its left vertically extending half, which is designated by A), the conventional way of action on the basis of corresponding figure examples, whereas the right vertical half being designated by B) illustrates the way of action in accordance with the invention based on equivalent figures.

The goods receipt as well as the goods issue (shipping) is common to the comparison, which have been fixed to 150 pal/h with the example described in FIG. 6.

Assuming that a pallet is loaded in average with 50 packing units, averagely arranged in six pallet layers, 7500 double cycles thus already result according to the prior art from the step of singularization. As explained above, a double cycle is to be understood as any kind of movement (feeding, dispensing, transferring, etc.) of a transport unit (pallet, container, tray, etc.). Since the packing units are individually singularized in the prior art, hence 7500 packing units are transferred onto 7500 trays each hour. In accordance with the present invention, merely 900 double cycles are required in the same period of time, since entire pallet layers are put onto trays, wherein the trays are adapted for receiving a complete pallet layer.

The step of storing, which follows the singularization in the prior art, into, e.g., an automated automatic small part warehouse ("ASPW"), in turn, requires 7500 storing cycles in the prior art, whereas merely 900 cycles for storing into the tray warehouse are necessary in accordance with the invention.

As a result, particularly under the default of a complete automation, a greater number of storage machines are required in the prior art, in order to store the same number of packing units in the same period of time. If the order-picking system is operated in accordance with the present invention, the number of storage machines required for the purpose of storing (and retrieving) the packing units is reduced. A customer of an order-picking system, which is operated in accordance with the method of the present invention, thus, can reach faster the point where the investment costs have been gained.

This is also expressed in the following blocks to be compared. In the prior art, an ASPW, for example, needs to use 60 aisles and 300,000 storage positions for implementing the order-picking buffer. The ASPW of the prior art, for that purpose, needs to be able to stock packing units for a longer period of time. Therefore, 60 rack aisles are to be provided with a rack assembly. Correspondingly many racks are required for generating the space needed for the 300,000 storage positions.

The present invention provides a tray warehouse which merely comprises 30,000 storing positions and six aisles. Here, it is to be noted that the storing positions, on the one hand, have to have greater dimensions as in the prior art, since complete pallet layers are loaded onto the trays. In this connection, however, it is to be noted that a pallet layer having, for example, ten packing units is packed in a much denser manner than ten single packing units on single trays. Thus, with the present invention the warehouse is reduced in size (due to minimizing of the space between individual packing units). The present invention provides a higher dynamic in the region of the high-bay warehouse and the tray warehouse. In this context, it is particularly referred to the distinguishing number of cycles with regard to the depalletizing process and the storing into the tray warehouse.

A packing process is viewed in the next comparison.

In the prior art, in turn, 7500 movements within the warehouse are required for retrieving 7500 packing units/h. Due to the great number of conveyor techniques used for retrieving, sorting and sequencing of 7500 units/h is inevitable in the prior art.

In accordance with the present invention, here now two cases have to be considered.

The last two steps, shown at the left hand side of FIG. 6B), show the retrieval and the packing, taking note of batch formation, whereas the right branch shows retrieval and packing without batch formation.

Assuming that 7500 packing units to be picked each hour correspond to 3500 order lines, these 3500 order lines can be combined in average to 1800 batches. 1800 batches, in turn, represent 1800 retrieval cycles (retrievals from the tray warehouse). Thus, sufficient packing units for packing 150 pal/h are retrieved.

Without a batch formation 3500 cycles need to be performed with 3500 order lines, still resulting in a factor of about 2.14 in comparison to the prior art.

Also, the method of the present invention is characterized by higher dynamics even if less storage and conveyor technique is used.

Figure 7:
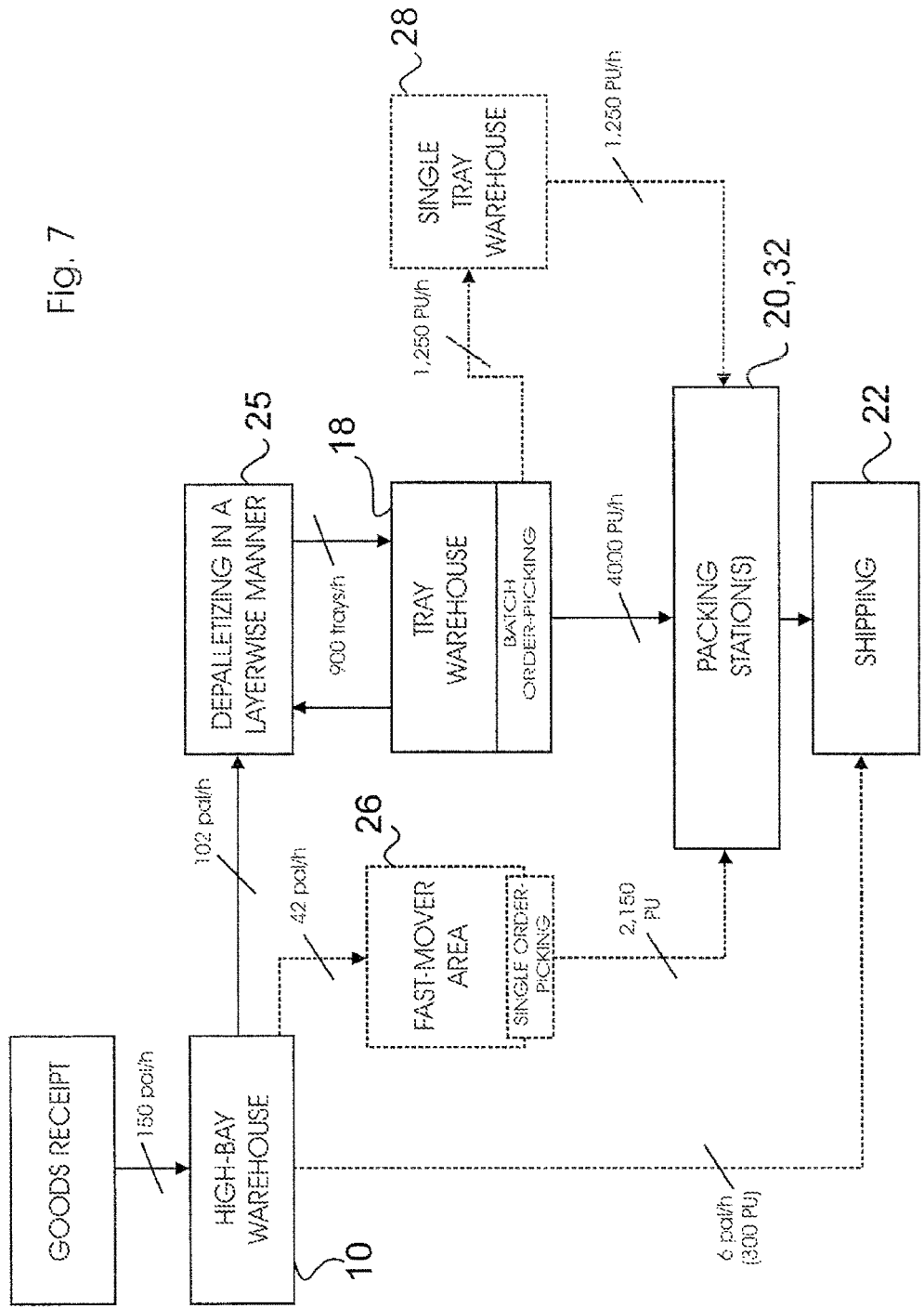
FIG. 7 shows a block diagram of another order-picking system suitable for performing the method of the present invention.

With reference to FIG. 7 a modification of FIG. 5 is illustrated, integrating order picking system elements already known, such as the fast-mover area 26 (cf. FIG. 2) and the single-tray warehouse 28 (cf. FIG. 2), into the concept of the present invention.

Here, also the flow of packing units between the individual components of an order-picking system is shown, which is operated in accordance with the present invention.

102 pallets of the 150 pal/h are handled via the tray warehouse, 42 pallets are handled via the fast-mover area, and 6 pallets are directly transported to the shipping without passing neither the tray warehouse nor the fast-mover area.

In FIG. 7, particularly the flow of goods between the tray warehouse 18 and the single-tray warehouse 28 is shown.

Packing units can be transferred, for example, from the tray warehouse 18 into the single-tray warehouse 28 if storing back a tray, from which it was picked, does make less sense due to a lower number of remaining packing units. For example, if each tray is loaded by ten packing units and nine packing units have been removed for packing or for processing an order-picking order already from the tray, the superordinated control can decide that here a remaining packing unit can be transferred onto a single tray and transported on the single tray into the single-tray warehouse 28. Thereby, a storing position within the tray warehouse 18 becomes empty, which, in turn, can be refilled from the high-bay warehouse 10 via the depalletizing area 25.

Packing units located on single trays in the single-tray warehouse 28 can be used for stocking and completing order-picking orders at the packing stations 20, 30. Thus, it is conceivable that for the purpose of completing an order-picking order merely one single packing unit is needed. Before a completely loaded tray is transported from the tray warehouse 18 to the packing station 20, 30, in order to be stored back subsequently, it is wiser to provide the single packing unit from the single-tray warehouse 28. This measure, in turn, increases the dynamics, particularly in the region of the tray warehouse 18.

Further, an advantageous modularity and scalability of the concept of the present invention results from the block diagram shown in FIG. 7. Order-picking systems operating according to the method of the present invention can be expanded by known components of order-picking systems. The dimension of the order-picking system elements needed for conducting the method of the present invention can be selected arbitrarily due to the known elements of the order-picking system. This enlarges the freedom of a designer when providing the concept for an order-picking system.

Additionally, existing order-picking systems can be converted correspondingly, for being operated in accordance with the method of the present invention.

Thus, a significant reduction of the complexity with regard to the warehouse management and control is possible. The warehouse structure can grow with changing processes and requirements. A warehouse can grow at any time with regard to volume, number of articles, modifications in the structure of orders, and performance, without amending the concept.

With reference to FIG. 8 a preferred embodiment of the flow of load supports (pallets, trays) is shown in an order-picking system operated in accordance with the method of the present invention.

Completely loaded pallets are transported from the goods receipt to the high-bay warehouse. Complete pallets can be transported from the high-bay warehouse into the fast-mover area. However, the pallets can also be transported directly to the shipping. Completely or partially loaded pallets are supplied to the depalletizing area 25.

The depalletizing area 25 can, optionally, also singularize individually trays into the tray warehouse 18, the trays being respectively loaded with a pallet layer, beside the depalletizing in a layer-wise manner for the purpose of storing. Thus, single packing units can be transported on single trays into the optional single-tray warehouse 28. The same applies with respect to remaining stocks from the tray warehouse 18. Empty trays from the tray warehouse 18 can be transported back (particularly via the tray warehouse) to the depalletizing area 25. Otherwise, loaded trays are transported from the tray warehouse 18 to the packing station 20, 30. The same applies with respect to single trays from the single-tray warehouse 28. The packing station 20, 30, for example, can also be supplied with packing units from the fast-mover area (cf. FIG. 2) by means of a conveyor technique, the packing units preferably being arranged in a sequenced manner on the conveyor technique.

Therefore, I claim:

1. A method for operating an order-picking system, wherein the order-picking system comprises a high-bay warehouse, at least one tray warehouse, at least one packing station, and at least one shipping station, the method comprising:
  a) depalletizing in a layerwise manner packing units forming a, particularly complete, pallet layer from a pallet, particularly a Europool palette, which carries respectively a plurality of packing units, which are to be picked, of one type of article, onto a correspondingly dimensioned tray;
  b) bringing the tray loaded with the pallet layer into the tray warehouse, preferably by means of a conveyor, a storage machine and/or a lift;
  c) recalling the tray loaded with the pallet layer in accordance with an order-picking order or several order-picking orders to the packing station;
  d) removing, in accordance with the order-picking order or one of the order-picking orders, a predetermined number of packing units, which are to be picked, and packing the removed packing units onto a shipping support, in order to ship the shipping support to a customer, if the order-picking order is completed;
  wherein the tray is either stored back into the tray warehouse or is disbanded into single packing units after the removal of packing units, if not all packing units of the pallet layer have been removed, the single packing units being transferred onto corresponding single trays and brought subsequently into a separate single-tray warehouse, in order to be brought again to the packing station later for completing another order-picking order.

2. A method for operating an order-picking system, wherein the order-picking system comprises a high-bay warehouse, at least one tray warehouse, at least one packing station, and at least one shipping station, the method comprising:
  a) depalletizing in a layerwise manner packing units forming a pallet layer from a pallet, which carries respectively a plurality of packing units, which are to be picked, of one type of article, onto a correspondingly dimensioned tray;
  b) bringing the tray loaded with the pallet layer into the tray warehouse;
  c) recalling the tray loaded with the pallet layer in accordance with an order-picking order or several order-picking orders to the packing station; and
  d) removing a predetermined number, in accordance with the order-picking order or one of the order-picking orders, of packing units, which are to be picked, and packing the removed packing units onto a shipping support, in order to ship the shipping support to a customer, if the order-picking order is completed;
  wherein the tray is either stored back in the tray warehouse or is disbanded into single packing units after the removal of packing units, and if not all packing units of the pallet layer have been removed the single packing units are transferred onto corresponding single trays and brought subsequently into a separate single-tray warehouse, in order to be brought again to the packing station later for completing another order-picking order.

3. The method of claim 2, wherein the layerwisely depalletized packing units form a complete pallet layer.

4. The method of claim 2, wherein the tray is brought into the tray warehouse via a conveyor, a storage machine or a lift.

5. The method of claim 2, further comprising:
  storing of at least one pallet in the high-bay warehouse, wherein the packing units are stacked on the pallet in terms of at least one pallet layer.

6. The method of claim 5, wherein the storing of the at least one pallet in the high-bay warehouse is repeated until all types of articles of an assortment are stocked in a sufficient number on pallets in the high-bay warehouse, allowing operation of the order-picking system for several days or weeks without restoring pallets.

7. The method of claim 2, wherein only trays loaded respectively with one pallet layer are stored in the tray warehouse.

8. The method of claim 2, wherein several order-picking orders are combined to form a batch so that all packing units being loaded in the form of a pallet layer onto the tray are removed from the tray at the packing station so that the tray is empty after the removal.

9. The method of claim 2, wherein the combining to form the batch happens in accordance with groups of article types.

10. The method of claim 2, wherein the operation b) comprises:
  transporting the tray loaded with the pallet layer into the tray warehouse; and
  storing the tray into a storing position of the tray warehouse.

11. The method of claim 2, wherein the operation c) comprises:
  retrieving the tray from the tray warehouse; and
  transporting the retrieved tray to the packing station by means of a conveyor.

12. The method of claim 2, wherein the operation d) is executed at the packing station which is spatially integrated into the tray warehouse.

13. The method of claim 2, wherein the operation a) comprises:
  transporting a pallet from the high-bay warehouse to a depalletizing device;
  removing a pallet layer from the pallet; and
  putting the retrieved pallet layer onto the correspondingly dimensioned tray.

14. The method of claim 13, where the pallet is transported form the high-bay warehouse to the depalletizing device by means of a rack serving device.

15. The method of claim 13, wherein, if a type of article needed for the completion of an orderpicking order is not present in accordance with a predetermined number of packing units in the tray warehouse, respectively only one pallet layer is retrieved and disposed, and respectively only one tray is transported into the tray warehouse until the predetermined number is achieved in the tray warehouse.

16. The method of claim 15, wherein, if the predetermined number is achieved in the tray warehouse, the pallet, from which one or more pallet layers are to be removed, is stored back into the high-bay warehouse, if the pallet still carries at least one pallet layer of packing units.

17. The method of claim 2, wherein completely loaded pallets carrying a type of article which is present in an higher-than-average manner in order-picking orders is retrieved from the high-bay warehouse and provided in a fast-mover area, which is part of the order-picking system, in order to allow packing of packing units onto a shipping support by bypassing the tray warehouse.

18. The method of claim 2, wherein the operation a) comprises:
   manually transferring pallet layers consisting of packing units of one type of article which cannot be transferred in an automated manner, onto trays.

19. The method of claim 2, wherein the trays are sorted during the operation d), in order to reach the packing station in accordance with a predetermined sequence.

20. The method of claim 2, wherein several order-picking orders are processed in a parallel manner.

* * * * *